US010896523B2

(12) United States Patent
Mavridis et al.

(10) Patent No.: US 10,896,523 B2
(45) Date of Patent: Jan. 19, 2021

(54) DEPTH IMAGE COMPRESSION

(71) Applicant: Microsoft Technology Licensing, LLC, Redmond, WA (US)

(72) Inventors: Pavlos Mavridis, Reutlingen (DE); Dag Birger Frommhold, Metzingen (DE); Benjamin Markus Thaut, Stuttgart (DE)

(73) Assignee: Microsoft Technology Licensing, LLC, Redmond, WA (US)

( * ) Notice: Subject to any disclaimer, the term of this patent is extended or adjusted under 35 U.S.C. 154(b) by 106 days.

(21) Appl. No.: 16/372,278

(22) Filed: Apr. 1, 2019

(65) Prior Publication Data
US 2020/0311983 A1 Oct. 1, 2020

(51) Int. Cl.
*G06T 9/40* (2006.01)
(52) U.S. Cl.
CPC ...................... *G06T 9/40* (2013.01)
(58) Field of Classification Search
CPC .......................................................... G06T 9/40
See application file for complete search history.

(56) References Cited

U.S. PATENT DOCUMENTS

| 2006/0029134 A1* | 2/2006 | Winder | H04N 19/46 |
| | | | 375/240.12 |
| 2009/0161989 A1* | 6/2009 | Sim | H04N 19/597 |
| | | | 382/285 |
| 2011/0268367 A1* | 11/2011 | Strom | G06T 9/00 |
| | | | 382/233 |
| 2014/0285626 A1* | 9/2014 | Fu | H04N 13/271 |
| | | | 348/46 |
| 2017/0316602 A1* | 11/2017 | Smirnov | G06T 15/205 |
| 2018/0288415 A1* | 10/2018 | Li | H04N 19/13 |
| 2019/0325613 A1* | 10/2019 | Wu | H04N 19/98 |
| 2020/0111237 A1* | 4/2020 | Tourapis | G06T 9/001 |

FOREIGN PATENT DOCUMENTS

| EP | 2076048 | 7/2009 |
| WO | 2018099571 A1 | 6/2018 |

OTHER PUBLICATIONS

Sanchez, et al., "Analysis of Parallel Encoding using Tiles in 3D High Efficiency Video Coding", in Signal, Image and Video Processing, vol. 13, No. 6, Mar. 4, 2019, pp. 1079-1086.
"International Search Report and Written Opinion Issued in PCT Application No. PCT/US20/020585", dated Aug. 3, 2020, 17 pages.

* cited by examiner

*Primary Examiner* — David Bilodeau
(74) *Attorney, Agent, or Firm* — Alleman Hall Creasman & Tuttle LLP

(57) ABSTRACT

A method for compressing a depth image including a matrix of pixels, each pixel including a pixel depth value, includes dividing the depth image into a plurality of non-overlapping tiles. Each of the plurality of non-overlapping tiles includes a contiguous subset of pixels. For each of the plurality of non-overlapping tiles, the pixel depth values are quantized into quantized pixel depth values. For each of the plurality of non-overlapping tiles, the quantized pixel depth values are encoded into a compressed depth image.

20 Claims, 10 Drawing Sheets

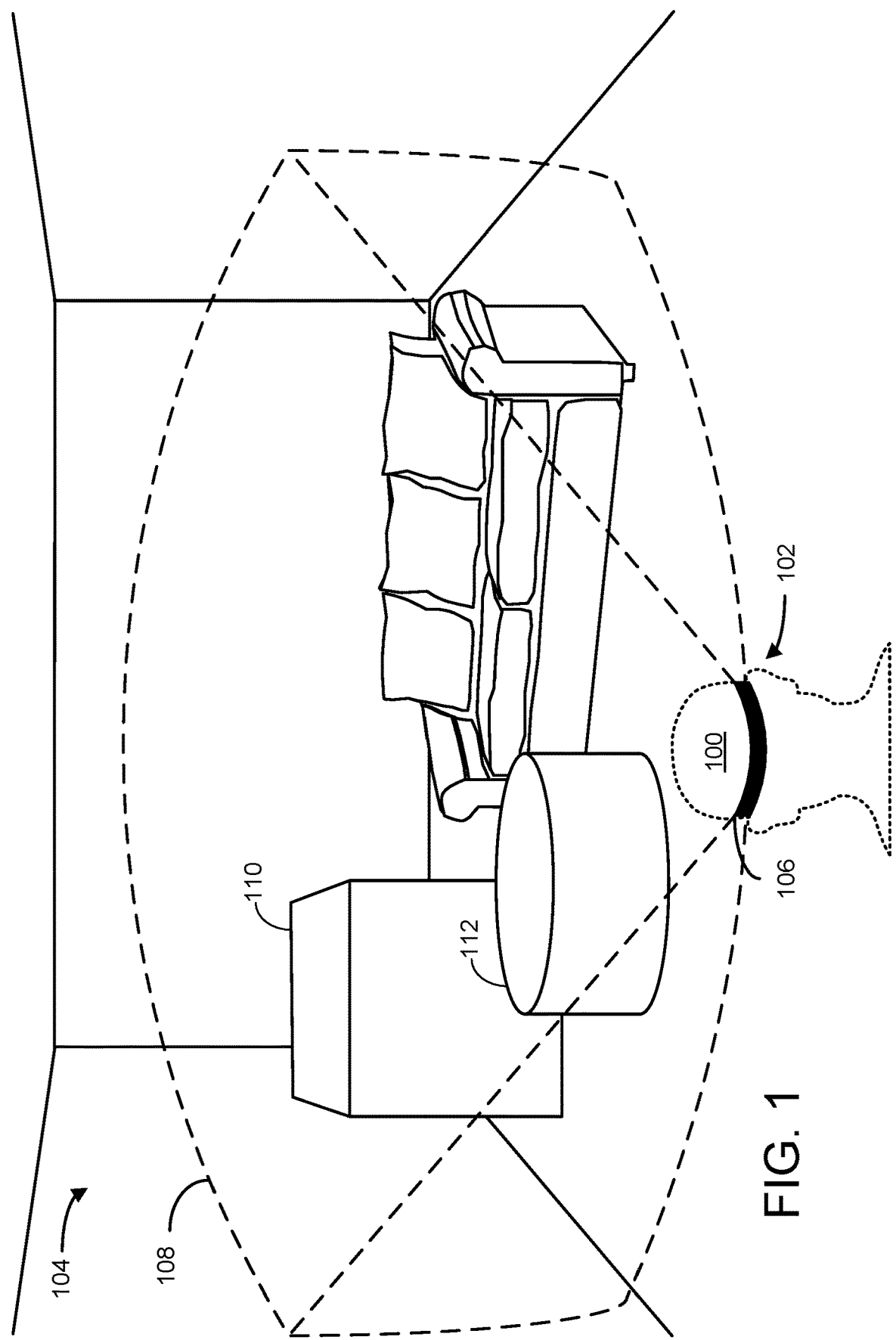

DEPTH IMAGE COMPRESSION

BACKGROUND

A variety of data compression techniques can be used for compressing digital files, such as digital images and videos. Use of compression can reduce the amount of storage space required to store a particular digital file on a computing device, as well as reduce the amount of bandwidth necessary to transmit the digital file from one device to another.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A method for compressing a depth image including a matrix of pixels, each pixel including a pixel depth value, includes dividing the depth image into a plurality of non-overlapping tiles. Each of the plurality of non-overlapping tiles includes a contiguous subset of pixels. For each of the plurality of non-overlapping tiles, the pixel depth values are quantized into quantized pixel depth values. For each of the plurality of non-overlapping tiles, the quantized pixel depth values are encoded into a compressed depth image.

BRIEF DESCRIPTION OF THE DRAWINGS

FIG. 1 schematically illustrates display of virtual objects.

DETAILED DESCRIPTION

Figure 2A:
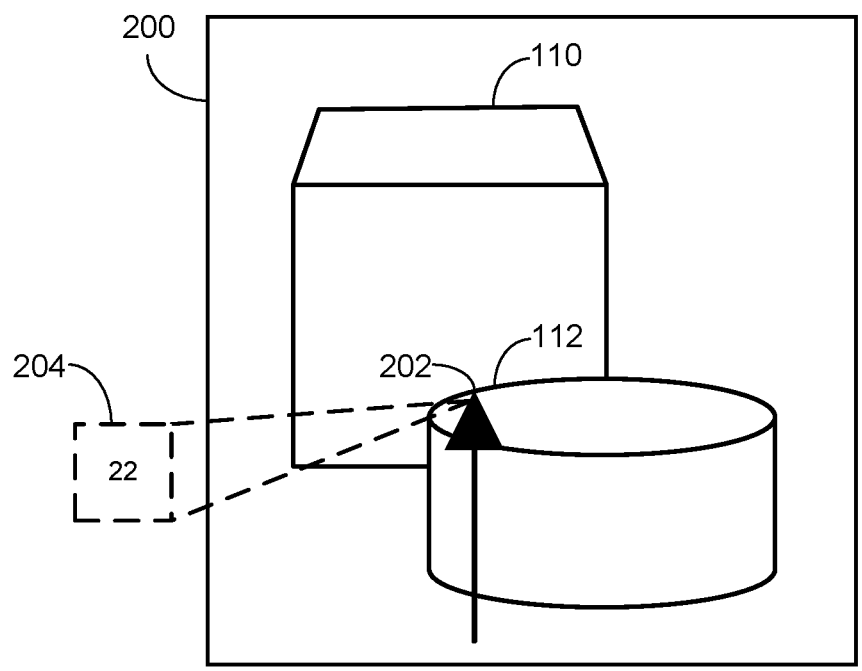
FIG. 2A schematically shows a visual representation of an example depth image.

Depth images include, for each pixel in the image, a pixel depth value that indicates how far a subject represented by the pixel is from a particular viewpoint. Such depth images are useful for encoding the three-dimensional (3D) geometry of one or more real or virtual objects in a scene, as well as the entire scene itself. For instance, a depth image captured of a real-world environment may be used to generate a virtual representation of the real-world environment at a remote location. This may be used, as one example, to facilitate 3D videoconferencing, in which a participant in the videoconference may view a 3D virtual representation of another participant that updates in real time. As another example, a depth image may encode the 3D geometry of a fully virtual scene (or a hybrid scene including a mix of real and virtual objects) from a particular viewpoint, which may then be transmitted to another device and/or stored for later use. For instance, a detailed virtual environment may be rendered by a server having substantial processing resources, and some representation (e.g., a depth image) of the virtual environment may be transmitted to a remote device having relatively less processing power. In this manner, the remote device may present a virtual scene that is relatively more complex than what the remote device could generate by itself.

Depending on the pixel resolution and depth resolution of a particular depth image, a substantial amount of computer data may be used to encode the pixel depth values. This can make depth images relatively computationally expensive to store and/or transmit over bandwidth-limited connections. However, while existing compression techniques are generally effective at reducing the size of conventional digital files, such as audio files, videos, typical color images, etc., such compression techniques are generally less effective at compressing depth information, such as the pixel depth values found in depth images and depth videos. For instance, compression techniques applied to typical color images and videos, like chroma subsampling, which is often used in many codecs (e.g., JPEG, 6264, HEVC) often take advantage of unique traits of the human visual system (such as the low sensitivity to high frequency color variations) to reduce the amount of data used, which is typically not applicable to depth information. Furthermore, compression techniques used for color images and videos generally encode a smaller range of values than what is typically required for depth information. Therefore, directly using such previous methods for encoding depth values typically gives inconsistent and sub-optimal results. However, because specialized encoding and decoding hardware for these pre-existing compression techniques is often built into consumer computing devices, such hardware can be leveraged using the techniques described herein to more efficiently compress depth information.

Furthermore, techniques exist for lossless compression of depth information, and are often used in graphics processing units (GPUs) to reduce bandwidth requirements during rendering. However, the compression ratio achieved by such techniques is on the order of 5:1 for complex scenes. By contrast, the depth information compression techniques described herein can achieve compression ratios on the order of 50:1, significantly reducing the amount of storage space and network bandwidth associated with storage and transmission of depth information.

Accordingly, the present disclosure is directed to techniques for compressing depth images. Specifically, a depth image including a matrix of pixels, each pixel having a pixel depth value, is divided into a plurality of non-overlapping tiles. Pixel depth values from each tile are then quantized and encoded into a compressed depth image using a video encoder. The compressed depth image may be stored for later use and/or transmitted to another device—e.g., as part of a videoconferencing application, remote rendering application, or other suitable purpose. In this manner, depth information for a real or virtual scene may be more efficiently stored and/or transmitted, conserving computer storage space and/or network bandwidth.

FIG. 1 schematically shows an example user 100 with a head-mounted display device (HMD) 102 in a real-world environment 104. Via a near-eye display 106 of HMD 102, user 100 has a field-of-view (FOV) 108, in which any virtual imagery displayed by HMD 102 may be visible to the user. Specifically, FIG. 1 includes two virtual objects 110 and 112 that are not physically present in the real-world environment, but rather are generated by the HMD and displayed such that they appear, from the perspective of user 100, to exist in the real world.

HMD 102, and/or another suitable device, may generate a depth image that represents any or all of the real/virtual objects visible to user 100. Such a depth image may, for instance, be transmitted to another device (e.g., another HMD at a physically remote location), which may then use the depth image to render a representation of the real and/or virtual content depicted by the depth image—e.g., as part of a 3D videoconferencing or remote rendering scenario.

Specifically, FIG. 2A schematically shows a visual representation of an example depth image 200 generated by HMD 102 and depicting virtual objects 110 and 112. Notably, in this case, the depth image represents only virtual objects. In other examples, however, a depth image may represent a real-world environment, and may be captured by a depth camera. As used herein, "depth camera" refers to any camera or system of cameras usable to infer the distance between the camera and each locus imaged in a pixel of an image captured by the camera. This can include, as examples, structured light infrared (IR) cameras, time-of-flight IR cameras, stereoscopic pairs of visible light cameras, etc. Furthermore, the depth image may include any suitable real and/or virtual content. In general, a depth image may represent a three-dimensional virtual scene (e.g., including one or more virtual objects or other virtual content) generated by a computing device, a real-world environment, or a mix of real and virtual content. While FIG. 2A schematically depicts the depth image as shapes easily understandable by a human, it is to be understood that depth images are often expressed as a matrix of pixels, wherein each cell in the matrix includes a depth value representing the distance from the camera to the object locus imaged by the corresponding pixel. Further, depth images may in some cases include one or more color and/or other channels for each pixel in addition to the pixel depth values.

In FIG. 2A, an arrow 202 points to one particular pixel in depth image 200 corresponding to an edge of virtual object 212. As shown, the particular pixel has a pixel depth value of 22, indicating that the locus imaged by the pixel is 22 units (e.g., inches, centimeters, or any other suitable measure of distance) away from the viewpoint. When the depth image includes real-world objects, the viewpoint will correspond to the position of the depth camera when the depth image was captured. However, when the depth image includes entirely virtual content, the viewpoint will correspond to a virtual camera position. For instance, a computing device may render a fully virtual three-dimensional scene, set any suitable virtual camera position relative to the scene, and generate a depth image from the virtual camera position.

Figure 2B:
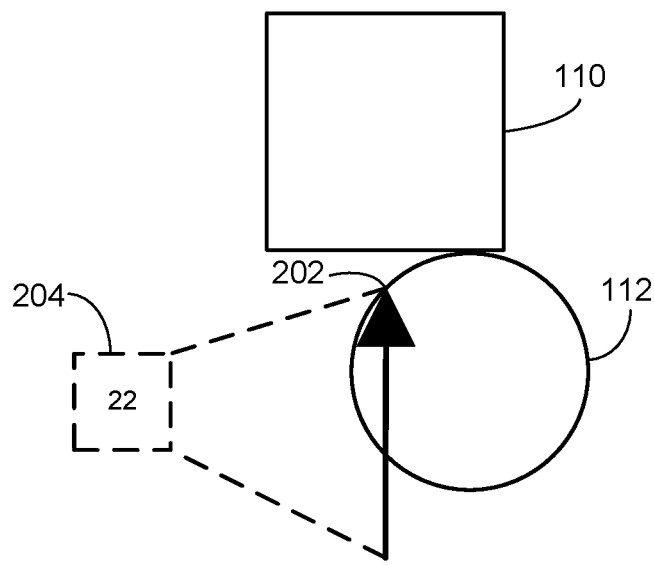
FIG. 2B shows an overhead view of virtual objects shown in the depth image of FIG. 2A.

FIG. 2B shows an overhead view of virtual objects 110 and 112. Arrow 202 still points to the position of the particular pixel on the edge of virtual object 112. From this perspective, however, it is clear that the pixel depth value is equal to the distance between the particular pixel and the viewpoint from which depth image 200 is viewed, corresponding to the start of arrow 202. It will be understood that other pixels in depth image 200 may have similar pixel depth values, each equal to the distance between the pixel and current viewpoint.

The pixel depth value may take any suitable form. In general, each pixel depth value in a depth image may have any suitable precision and use any suitable units or scale. In the example of FIGS. 2A and 2B, the pixel value is a relatively simple number expressed in the conventional base-10 decimal system. In other examples, however, pixel depth values may be expressed using binary, hexadecimal, or another suitable number system. For instance, pixel depth values may be expressed in binary as 16-bit values.

Figure 10:
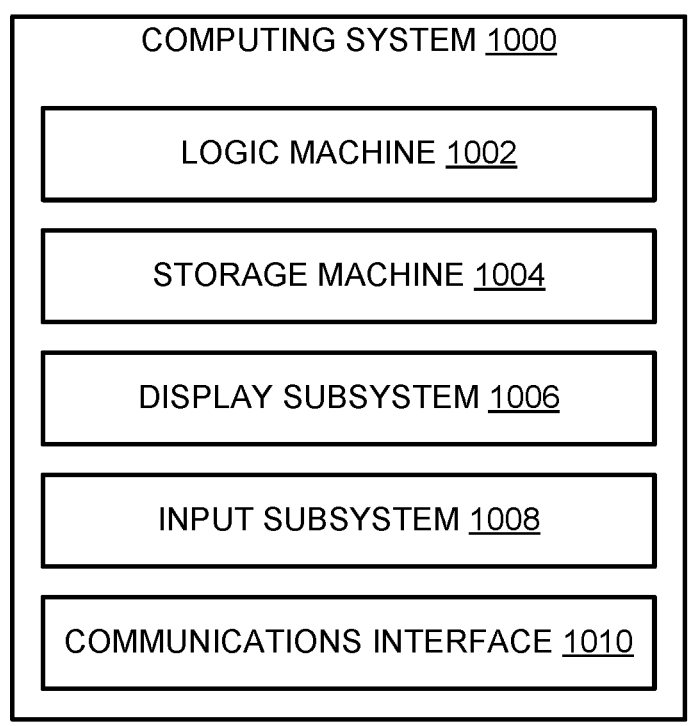
FIG. 10 schematically shows an example computing system.

Furthermore, in FIGS. 1, 2A, and 2B, the depth image was generated by an HMD and depicts virtual objects that are displayed to a user as part of an augmented reality experience. It will be understood, however, that this is a nonlimiting example. Rather, a depth image may take any suitable form and originate from any suitable device. Real or virtual content depicted in a depth image need not be visible to a human user at any point before or after generation of the depth image. Furthermore, as nonlimiting examples, computing devices usable to generate and/or compress a depth image may include desktop computers, laptop computers, servers, mobile devices (e.g., smartphones, tablets), wearable devices, augmented/virtual reality devices, media centers, etc. When applicable, such devices may include, or communicate with, a suitable depth camera. Computing system 1000, described below with respect to FIG. 10, is another non-limiting example of a computing device usable to generate and/or compress digital images.

Figure 3:
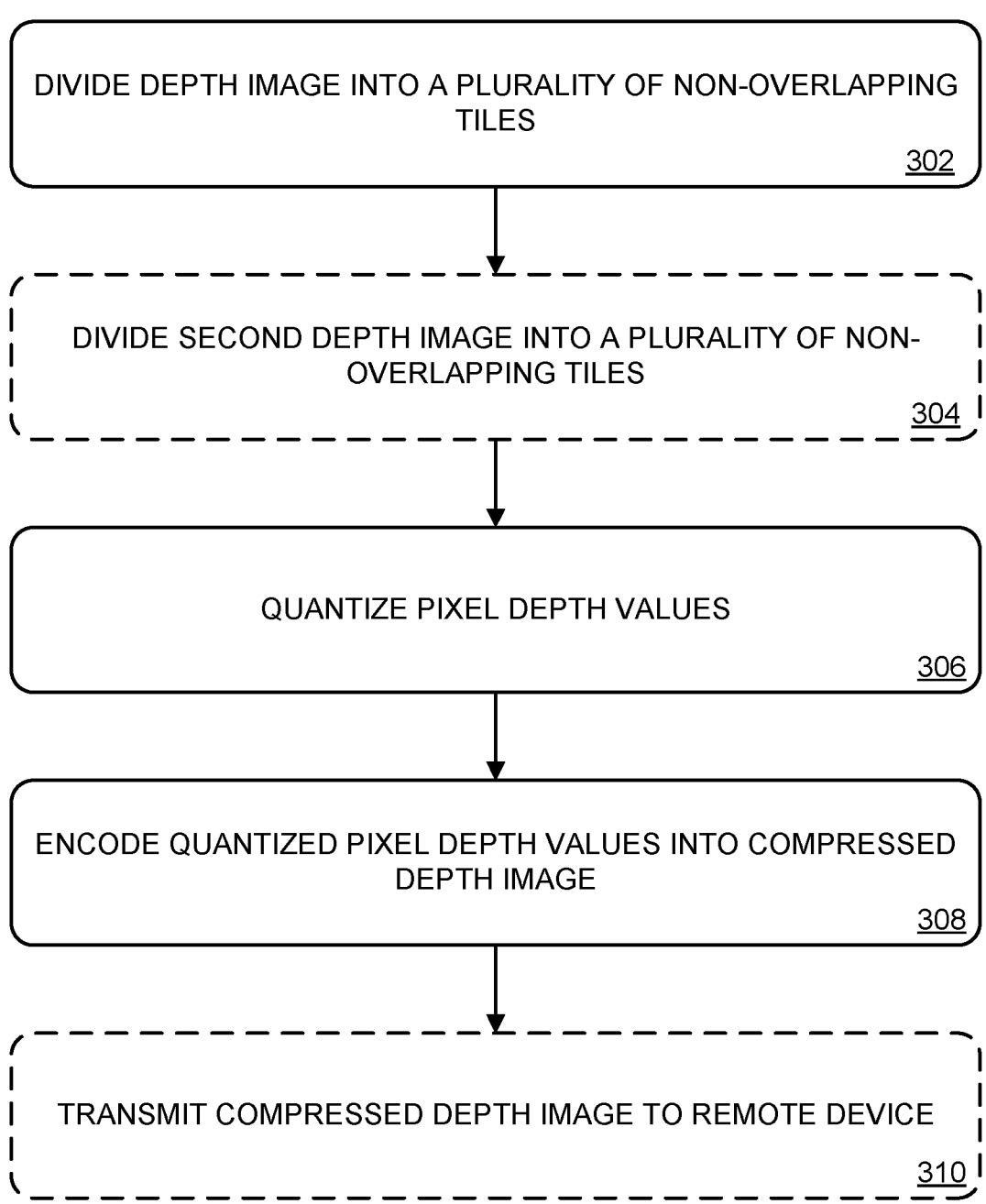
FIG. 3 illustrates an example method for compressing a depth image.

As discussed above, storing and/or transmitting depth images can be computationally expensive due to the amount of data that may be used to represent the plurality of pixel depth values. Accordingly, FIG. 3 illustrates an example method 300 for compressing depth images. Method 300 may be implemented on any suitable computing device having any suitable form factor and hardware configuration, including computing system 1000 of FIG. 10.

Figure 4A:
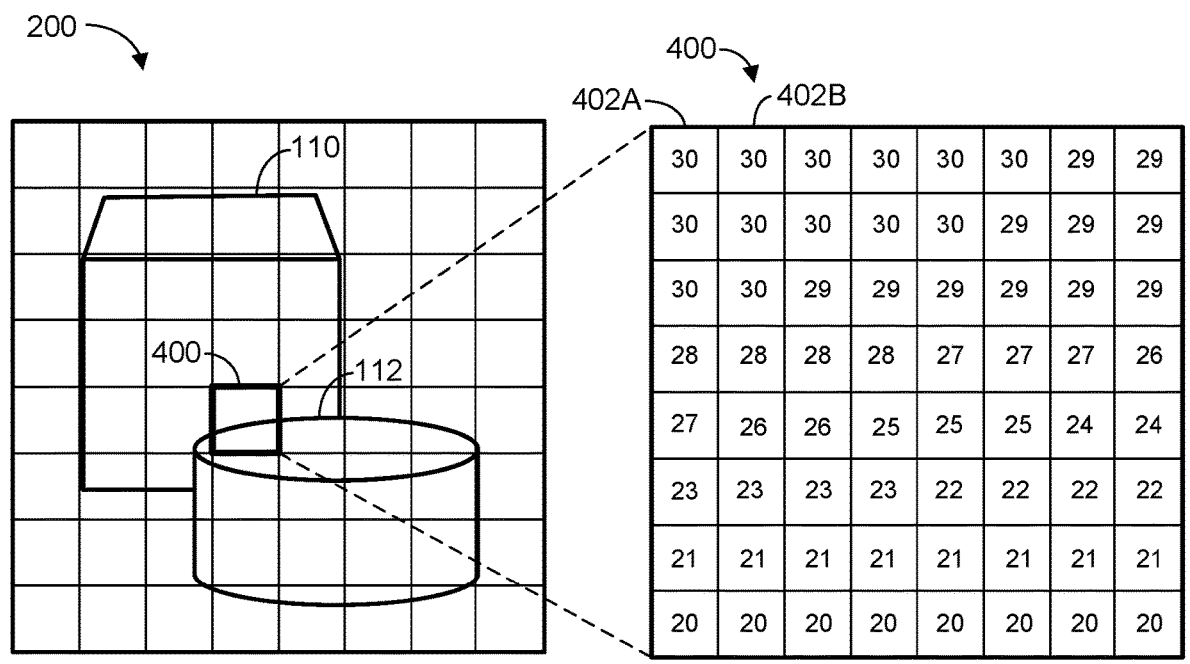
FIG. 4A schematically illustrates an example depth image divided into a non-continuous plurality of tiles, each tile including a contiguous plurality of pixels, and each pixel having a pixel depth value.

At 302, method 300 includes dividing a depth image into a plurality of non-overlapping tiles, each of the plurality of non-overlapping tiles including a contiguous subset of pixels. This is schematically illustrated in FIG. 4A, which again shows depth image 200. In FIG. 4A, however, depth image 200 has been divided into a plurality of non-overlapping tiles, including a tile 400. Tile 400 in turn includes a contiguous subset of pixels, including pixels 402A and 402B.

In FIG. 4A, depth image 200 is divided into square tiles, each tile including an 8×8 grid of pixels. However, this is a non-limiting example, and other depth images may be divided into any number of non-overlapping tiles, each tile having any suitable dimensions and including any number of pixels.

As shown, each of the pixels in tile 400 has a corresponding pixel depth value, in this case ranging from 20 to 30 (e.g., measured in centimeters, inches, or another suitable unit). As discussed above, however, pixel depth values may be encoded in any suitable way and using any suitable degree of precision. Furthermore, FIG. 4A only shows pixel depth values for pixels in tile 400. In other words, tile 400 does not include color or other non-depth channels. This is done for the sake of visual clarity, and depth images described herein may or may not encode the visual appearance of any real or virtual objects they represent in addition to pixel depth values, as discussed above.

Figure 4B:
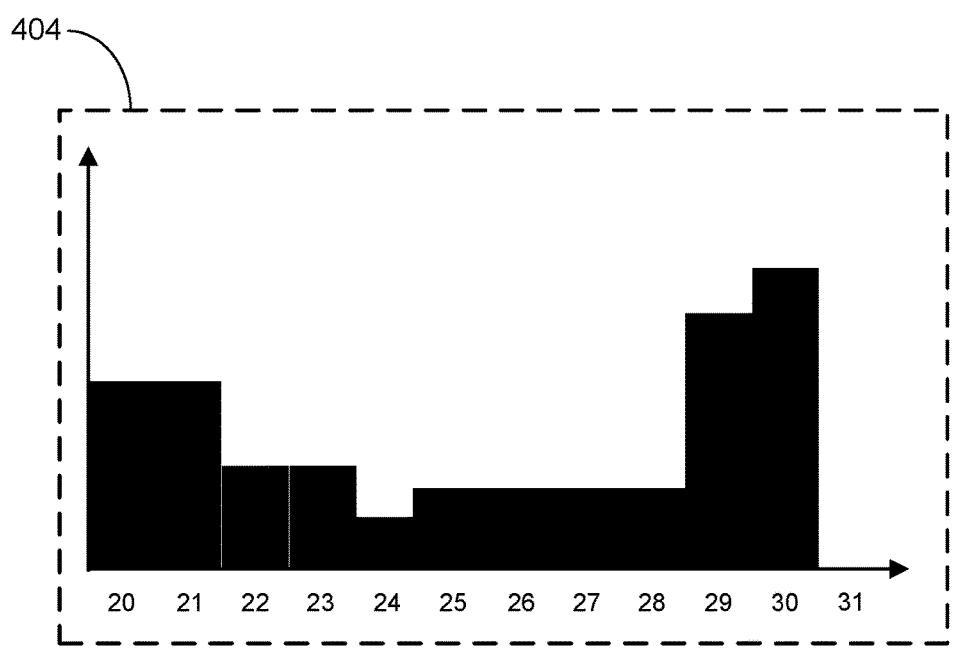
FIG. 4B shows a histogram for the pixel depth values shown in FIG. 4A.

FIG. 4B includes a histogram 404 that represents the distribution of pixel depth values in tile 400. As shown, tile 400 has a depth range of pixel depth values between a minimum pixel depth value (in this case 20) and a maximum pixel depth value (in this case 30). As will be described in more detail below, this range of pixel depth values may be quantized and eventually encoded into a compressed depth image.

Figure 5:
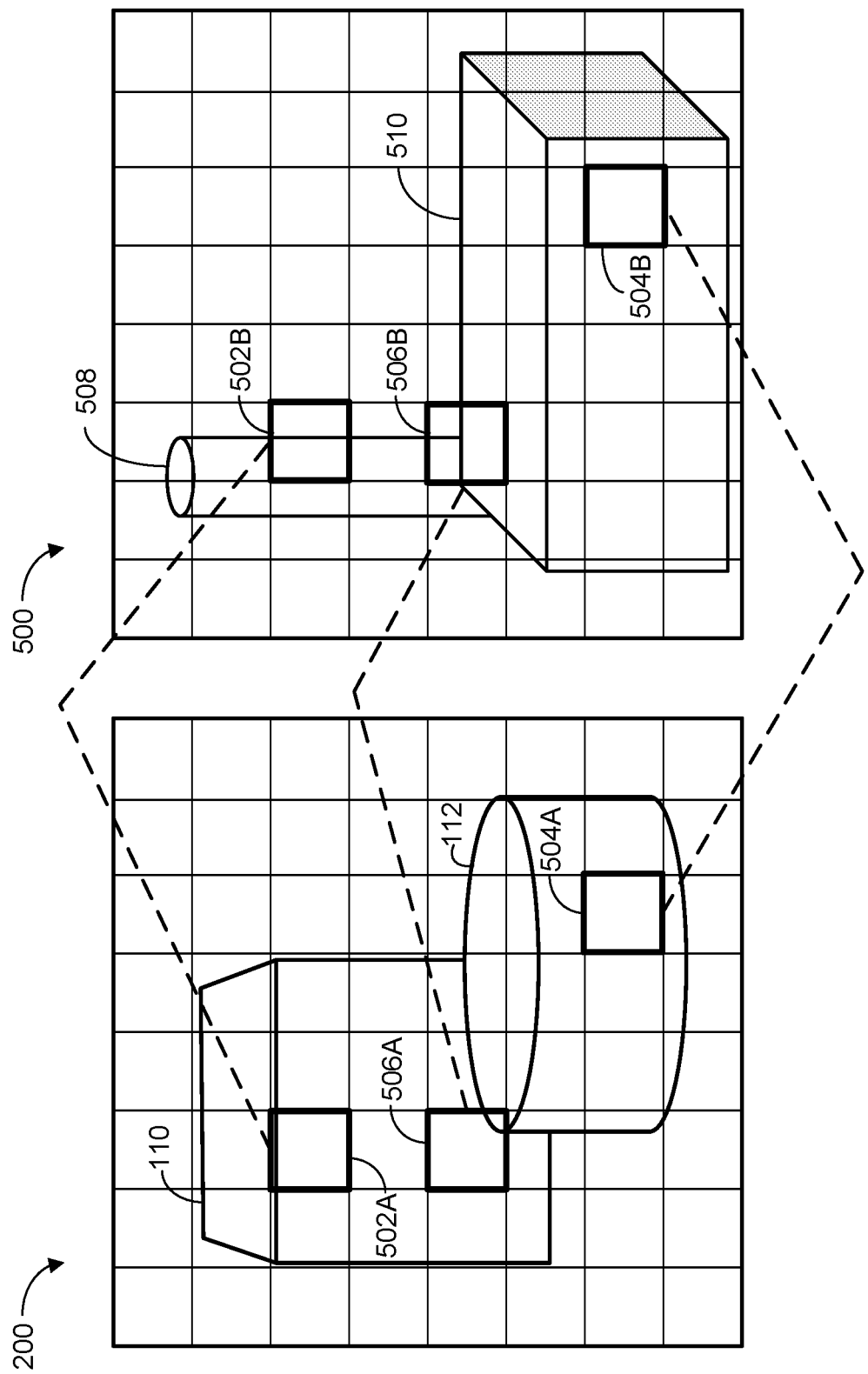
FIG. 5 depicts correspondences between non-overlapping tiles in two different depth images.

Returning briefly to FIG. 3, method 300 optionally includes, prior to quantizing the pixel depth values, dividing a second depth image into a second plurality of non-overlapping tiles, such that each tile in the first depth image has a corresponding tile in the second depth image. This is illustrated in FIG. 5, which again shows depth image 200. FIG. 5 also includes a second depth image 500, which has also been divided into a plurality of non-overlapping tiles. As shown, each non-overlapping tile in depth image 200 has a corresponding tile in second depth image 500, such that tiles 502A, 504A, and 506A in depth image 200 respectively correspond to tiles 502B, 504B, and 506B in depth image 500.

Similar to depth image 200, depth image 500 represents two virtual objects 508 and 510. In one example, the second depth image may be received from a remote computing device, and may represent a scene in which one or more objects rendered by the local computing device (e.g., objects 110 and 112 rendered by HMD 102) may be displayed. In other words, the compressed depth image ultimately generated by the local computing device may be transmitted to the remote computing device and composited with depth image 500, such that virtual objects 110 and 112 are shown in a three-dimensional virtual scene that also includes virtual objects 508 and 510. Thus, the remote computing device may provide a view of a three-dimensional virtual scene that includes virtual objects rendered by two different devices, which allows a more complicated scene to be displayed while reducing the processing resources expended by any individual device. Furthermore, because a compressed depth image is transmitted to the remote device, network bandwidth between the two devices may be conserved.

The second depth image may be received from the remote device in any suitable form. In some cases, the second depth image may be received as a compressed depth image and decompressed by the computing device, as will be described in more detail below. Alternatively, however, the depth image may be received in an uncompressed form, or the remote device may send a different representation of virtual objects 508 and 510. For instance, the remote device may send bounding boxes and spatial coordinates for each of virtual objects 508 and 510 defined relative to a coordinate system shared between the local and remote devices. Based on this information, in tandem with a virtual perspective (e.g., a virtual camera position) specified by the remote device, the second depth image may be generated at the local device instead of at the remote device.

Based on information included in the second depth image, the local computing device may modify or replace pixel depth values in depth image 200 to improve the efficiency with which the depth image may be compressed. As discussed above, a compressed version of depth image 200 may be transmitted to the remote device and composited with depth image 500. When this is done, some portions of virtual objects 110 and 112 may occlude, intersect with, or be occluded by some portions of virtual objects 508 and 510. These occlusion relationships can be used to reduce the amount of data included in the compressed depth image without compromising the view of the three-dimensional virtual scene displayed by the remote device.

To illustrate this, virtual object 110 in depth image 200 has a smaller virtual depth than virtual object 508 in depth image 500. Focusing specifically on tile 502A, a maximum pixel depth value of pixels in tile 502A is less than a minimum pixel depth value of pixels in corresponding tile 502B in the second depth image. In other words, even the closest pixel in tile 502B will still have a greater depth than even the farthest pixel in tile 502A. Thus, when depth image 200 is composited with depth image 500, pixels in tile 502A will completely occlude pixels in tile 502B. Given this, detailed pixel depth values for pixels in tile 502A need not be included in the compressed depth image. Rather, when pixel depth values are quantized as described below, a replacement pixel depth value equal to or less than the maximum pixel depth value for the tile may be used for each of the pixels in tile.

Similarly, virtual object 510 has a smaller virtual depth than virtual object 112. Focusing specifically on tile 504A, a minimum pixel depth value for pixels in the tile is greater than a maximum pixel depth value for corresponding tile 504B in the second depth image. Thus, when depth image 200 is composited with depth image 500, pixels in tile 504A will be completely occluded by pixels in tile 504B. Given this, detailed pixel depth values for pixels in tile 504A need not be included in the compressed depth image, as pixels in tile 504A will always be included. As such, when the pixel depth values are quantized, a replacement pixel depth value that is greater than or equal to the minimum pixel depth value for the tile may be used for each of the pixels in the tile.

Tiles 506A and 506B represent a more complicated case. Specifically, tile 506A has a range of pixel depth values that overlaps with a corresponding second range of pixel depth values of corresponding tile 506B in second depth image 500. Thus, when pixel depth values for tile 506A are quantized, an intersection between the range of pixel depth values for tile 506A and the corresponding range of pixel depth values for pixel 506B may be used.

Returning briefly to FIG. 3, at 306, method 300 includes, for each of the plurality of non-overlapping tiles in the depth image, quantizing the pixel depth values into quantized pixel depth values. For example, the computing device may, for each of the plurality of non-overlapping tiles, identify a depth range between a minimum pixel depth value and a maximum pixel depth value for pixels in the tile, and quantize pixel depth values over the range into quantized pixel depth values. This may involve setting new, quantized minimum and maximum pixel depth values, and adjusting each pixel depth value in the range to fit between the new quantized minimum and maximum values. The quantized minimum and maximum pixel depth values may be, for instance, 0 and 1, or any other suitable values. For example, if a tile includes a 300-unit range of depth values between 250 and 550, any particular depth value DV in that range can be quantized to a corresponding quantized value QV using the following equation: $QV = (DV - 250)/300$.

Figure 6:
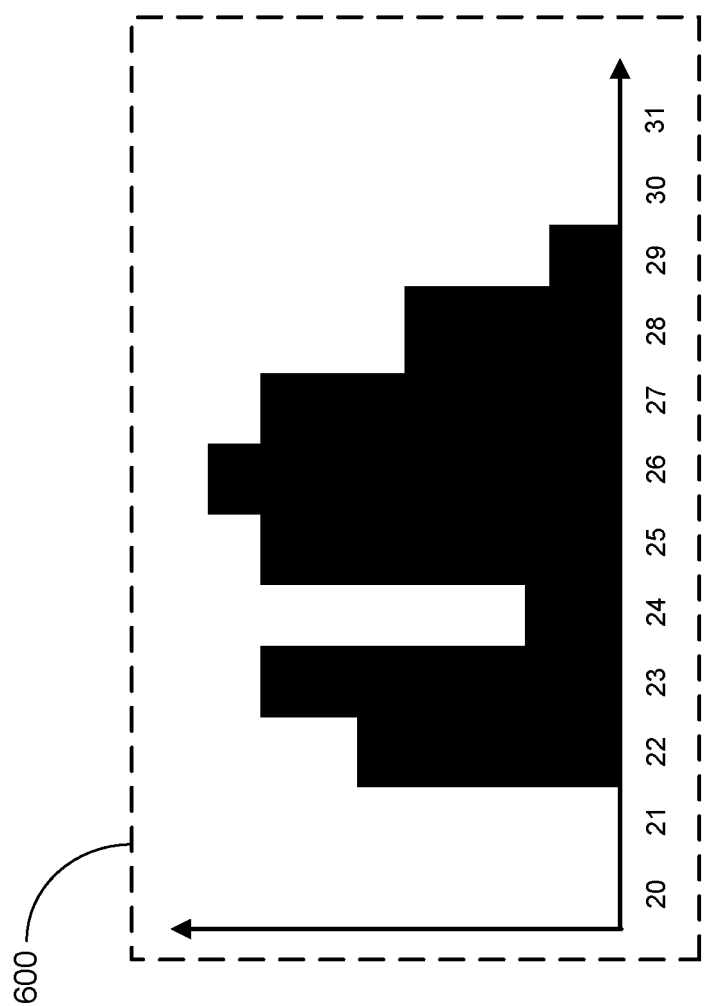
FIG. 6 illustrates quantization of pixel depth values for a non-overlapping tile of a depth image.
Figure 7:
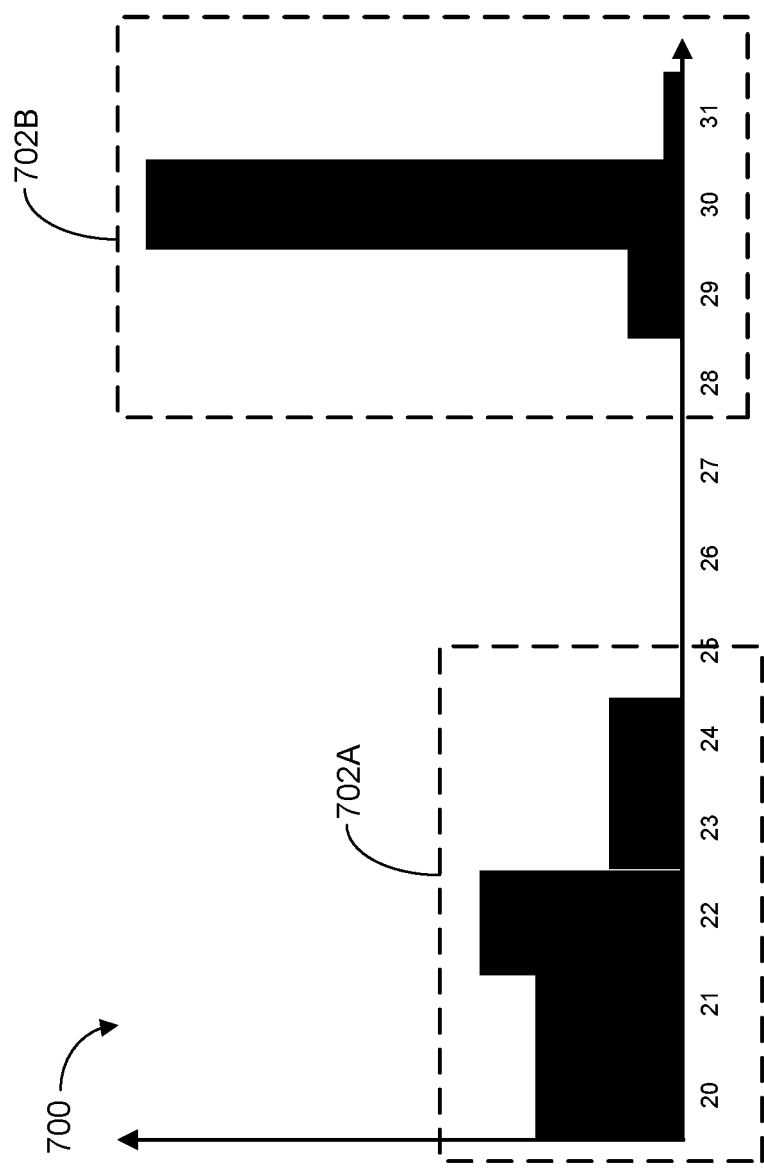
FIG. 7 illustrates independent quantization of two different depth value clusters in a non-overlapping tile having a non-continuous distribution of pixel depth values.

FIG. 6 shows a histogram 600 that depicts a distribution of pixel depth values for a tile of a depth image. As shown, pixel depth values in the histogram range from a minimum of 22 to a maximum of 29. In histogram 600, there is a continuous distribution of pixel depth values between the minimum value and maximum value. In other words, there are no gaps in the middle of the histogram. However, this will not always necessarily be the case. FIG. 7 shows another example histogram including pixel depth values for a different tile in a depth image. Unlike histogram 600, histogram 700 has a non-continuous distribution of pixel depth values, in that the range of pixel depth values includes two depth value clusters separated by a gap (i.e., there are not any pixels with depth values in the range from 26 to 28, although there are pixels with depth values smaller than and greater than this range). If the pixel depth values in the histogram were quantized over the range from the minimum value of 20 to the maximum value of 31, some portion of the quantized range would be reserved for depth values between 26 and 28 that are not actually represented in the tile. Thus, the actual pixel depth values would be represented in the quantized range with a non-optimal resolution.

Accordingly, quantizing pixel depth values may in some cases include, for each non-overlapping tile in a depth image, classifying the tile as having a continuous or non-continuous distribution of pixel depth values. Tiles having a non-continuous distribution of pixel depth values may include any tiles that have two or more depth value clusters separated by at least a threshold distance that has below a threshold number of pixel depth values. For instance, the threshold distance may be equal to one quarter of the total range from minimum to maximum, or another suitable threshold may be used. Similarly, the threshold number of pixels may be equal to one pixel, meaning a tile only has a non-continuous distribution if there are no pixels having pixel depth values between discrete depth value clusters. In other examples, however, the threshold number of pixel depth values may be greater than one, for instance to account for noise in the depth image.

For tiles having a non-continuous distribution of pixel depth values, each of the two or more depth value clusters for the tile may be independently quantized. In other words, the computing device may identify a minimum and maximum pixel depth value for each cluster, giving depth sub-ranges for each cluster, and each sub-range may then be quantized separately. This is illustrated in FIG. 7, in which histogram 700 features a depth value cluster 702A, ranging from 20 to 24, and a depth value cluster 702B, ranging from 29 to 31. Each of these depth value clusters may be separately quantized, as discussed above.

Quantizing pixel depth values from two or more different depth value clusters in this manner may give two or more separate sets of quantized pixel depth values. However, individual pixels in the separate sets of quantized pixel depth values may end up having equal or relatively similar quantized values, despite having relatively different original pixel depth values. In this example of FIG. 7, a pixel having a pixel depth value of 22 may be quantized as part of depth value cluster 702A to have a quantized value of approximately 0.5. Similarly, a different pixel having a pixel depth value of 30 may be quantized as part of depth value cluster 702B to also have a quantized value of approximately 0.5. Accordingly, each quantized pixel depth value for a given tile may have an associated identifier indicating which of the two or more separate sets the quantized pixel depth value belongs to. When only two separate sets are present, the associated identifier may take the form of a 1-bit value, although any suitable indicator having any suitable size may be used. The identifier may be associated with the corresponding range of depth values in the cluster, thus allowing original depth values to be extracted from the quantized values (e.g., during decoding).

Returning briefly to FIG. 3, at 308, method 300 includes, for each of the plurality of non-overlapping tiles, encoding the quantized pixel depth values into a compressed depth image. This may be done in any suitable way, and the specific details will vary depending on the specific encoder that is used. For instance, the quantized pixel depth values may be encoded using a monochrome (e.g., 4:0:0) video encoder. As examples, the 4:0:0 video encoder may be one of an h264 encoder, an h265 encoder, or an av1 encoder, and may in some cases be implemented in hardware of the computing device. Alternatively, the quantized pixel depth values may be encoded using a video encoder that produces full chroma channels (e.g., 4:4:4) or subsampled chroma channels (e.g., 4:2:2, 4:2:0). In such cases, encoding the quantized pixel depth values may include filling the chroma channels of the video encoder with zeroes. In general, any suitable encoder may be used, including video encoders and/or other encoders. Furthermore, such encoders may be implemented in hardware and/or software. Encoding of the quantized pixel depth values will preserve the identifiers associated with any quantized pixel depth values from tiles having a non-continuous distribution of pixel depth values.

Figure 8:
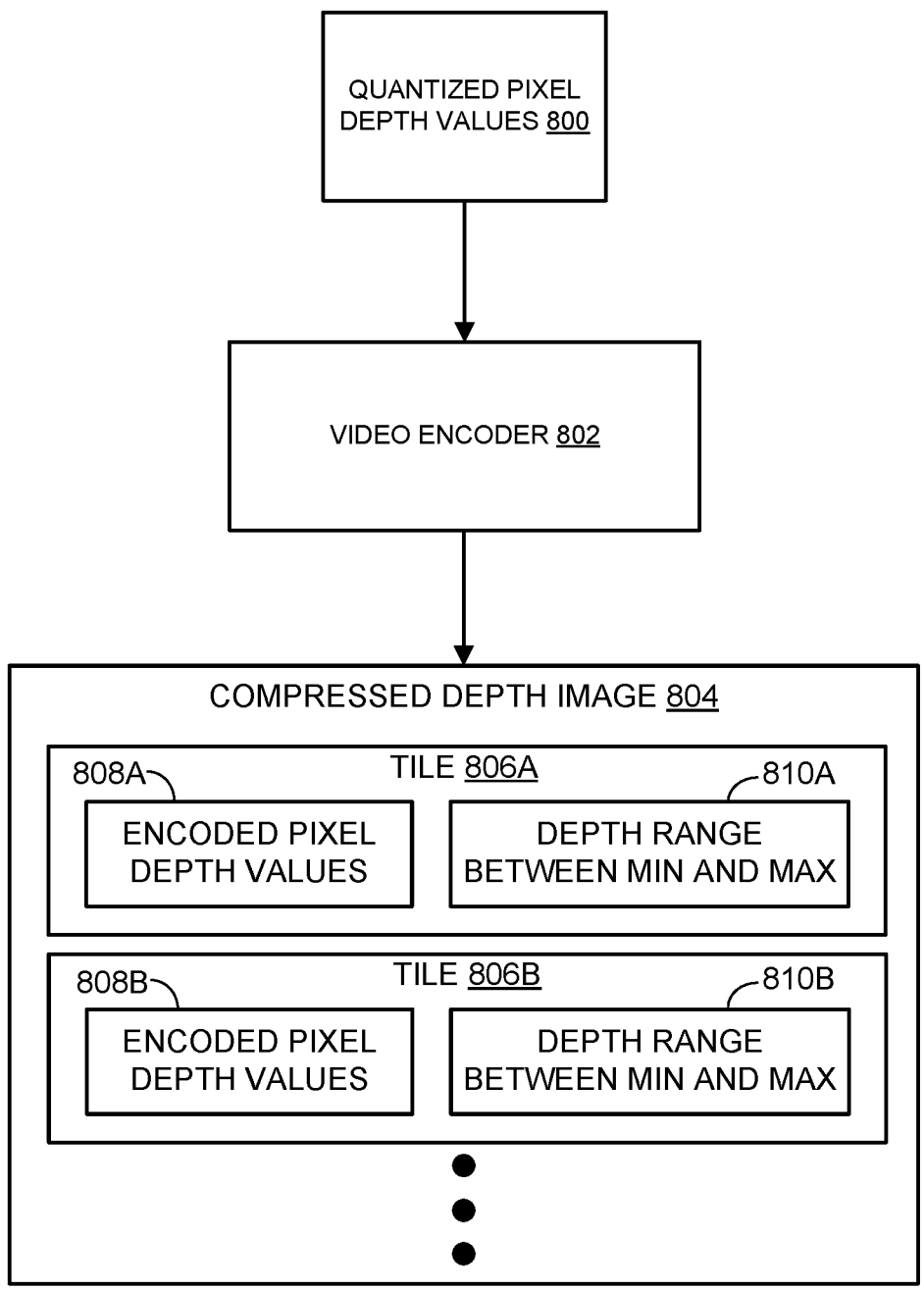
FIG. 8 schematically illustrates encoding of quantized pixel depth values into a compressed depth image.

FIG. 8 schematically illustrates encoding of quantized pixel depth values. Specifically, in FIG. 8, quantized pixel depth values 800 are encoded as encoded pixel depth values included in a compressed depth image 804 using a video encoder 802. Specifically, the compressed depth image includes, for each of a plurality of non-overlapping tiles 806 of the original depth image, encoded pixel depth values 808. Additionally, the compressed depth image may include, for each of the plurality of non-overlapping tiles, the depth range 810 between the minimum pixel depth value and maximum pixel depth value. In this manner, during decoding of the compressed depth image, quantized pixel depth values can be resolved to their original pixel depth values, because the original minimum and maximum pixel depth values for each tile are known. Such information may be included as part of the compressed depth image—for example, as metadata—or specified in another suitable manner or data structure.

Returning briefly to FIG. 3, at 310, method 300 optionally includes transmitting the compressed depth image to the remote device. As discussed above, the compressed depth image may in some cases be used by the remote device to display some representation of the real or virtual content represented by the compressed depth image—for example as part of a 3D videoconferencing or remote rendering application, in which the depth image is composited with a second depth image generated or maintained by the remote device. Additionally, or alternatively, the compressed depth image may be used by the remote device for any other suitable purpose.

Figure 9:
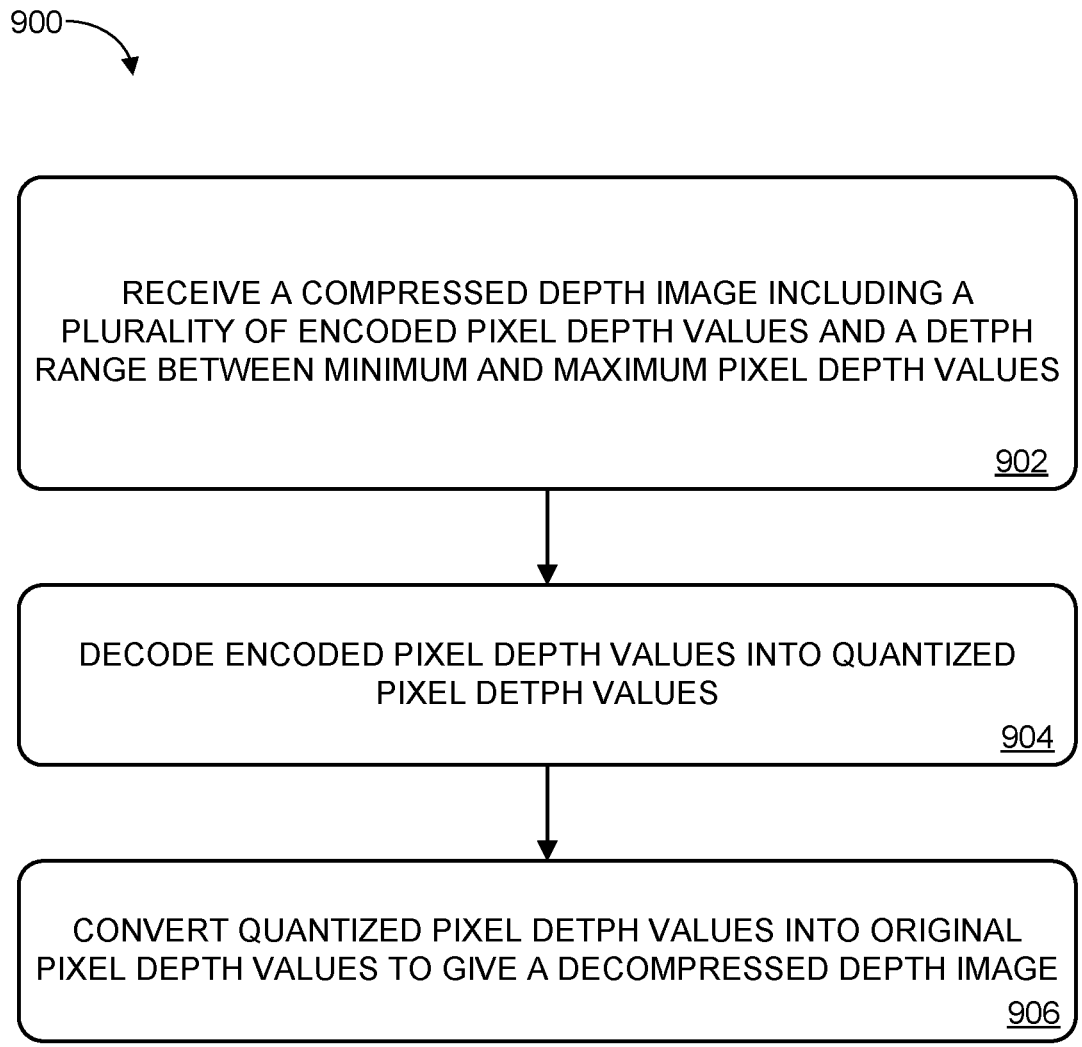
FIG. 9 illustrates an example method for decompressing a depth image.

Once the compressed depth image is received by the remote device, the remote device may decompress the compressed depth image. Accordingly, FIG. 9 illustrates an example method 900 for decompressing a compressed depth image. Method 900 may be implemented on any suitable computing device having any suitable form factor and hardware configuration, including computing system 1000 of FIG. 10.

At 902, method 900 includes receiving a compressed depth image. The compressed depth image may include a plurality of encoded pixel depth values that encode a plurality of original pixel depth values in a pre-compression version of the depth image. As discussed above, the pre-compression version of the depth image may be divided into a plurality of non-overlapping tiles each including a contiguous subset of pixels. The compressed depth image may further include a depth range between a minimum pixel depth value and a maximum pixel depth value for each of the plurality of non-overlapping tiles in the pre-compression version of the depth image.

At 904, method 900 includes decoding the encoded pixel depth values into quantized pixel depth values. The specific steps involved in decoding the encoded pixel depth values will vary depending on the specific video encoder used. As discussed above, pixel depth values may be encoded using a 4:0:0 video encoder, such as the h264, h265, and av1 video encoders, a 4:2:2 video encoder, and/or any other suitable encoder. In general, the decoder will be analogous to the encoder that is used.

At 906, method 900 includes converting the quantized pixel depth values into original pixel depth values to give a decompressed depth image. This may include, for example, replacing the quantized minimum and maximum pixel depth values for each tile with the minimum and maximum pixel depth values included in the compressed depth image. Other pixel depth values for each tile may then be adjusted over the range from minimum to maximum, giving the original pixel depth values for each pixel in the decompressed depth image.

In some embodiments, the methods and processes described herein may be tied to a computing system of one or more computing devices. In particular, such methods and processes may be implemented as a computer-application program or service, an application-programming interface (API), a library, and/or other computer-program product.

FIG. 10 schematically shows a non-limiting embodiment of a computing system 1000 that can enact one or more of the methods and processes described above. Computing system 1000 is shown in simplified form. Computing system 1000 may take the form of one or more personal computers, server computers, tablet computers, home-entertainment computers, network computing devices, gaming devices, mobile computing devices, mobile communication devices (e.g., smart phone), and/or other computing devices.

Computing system 1000 includes a logic machine 1002 and a storage machine 1004. Computing system 1000 may optionally include a display subsystem 1006, input subsystem 1008, communication subsystem 1010, and/or other components not shown in FIG. 10.

Logic machine 1002 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 1004 includes one or more physical devices configured to hold instructions executable by the logic machine to implement the methods and processes described herein. When such methods and processes are implemented, the state of storage machine 1004 may be transformed—e.g., to hold different data.

Storage machine 1004 may include removable and/or built-in devices. Storage machine 1004 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 1004 may include volatile, nonvolatile, dynamic, static, read/write, read-only, random-access, sequential-access, location-addressable, file-addressable, and/or content-addressable devices.

It will be appreciated that storage machine 1004 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 1002 and storage machine 1004 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 1000 implemented to perform a particular function. In some cases, a module, program, or engine may be instantiated via logic machine 1002 executing instructions held by storage machine 1004. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 1006 may be used to present a visual representation of data held by storage machine 1004. This visual representation may take the form of a graphical user interface (GUI). As the herein described methods and processes change the data held by the storage machine, and thus transform the state of the storage machine, the state of display subsystem 1006 may likewise be transformed to visually represent changes in the underlying data. Display subsystem 1006 may include one or more display devices utilizing virtually any type of technology. Such display devices may be combined with logic machine 1002 and/or storage machine 1004 in a shared enclosure, or such display devices may be peripheral display devices.

When included, input subsystem 1008 may comprise or interface with one or more user-input devices such as a keyboard, mouse, touch screen, game controller, and/or position/orientation sensors of a head-mounted display (HMD). In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 1010 may be configured to communicatively couple computing system 1000 with one or more other computing devices. Communication subsystem 1010 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 1000 to send and/or receive messages to and/or from other devices via a network such as the Internet.

In an example, a method for compressing a depth image including a matrix of pixels, each pixel including a pixel depth value comprises: dividing the depth image into a plurality of non-overlapping tiles, each of the plurality of non-overlapping tiles including a contiguous subset of pixels; for each of the plurality of non-overlapping tiles, quantizing the pixel depth values into quantized pixel depth values; and for each of the plurality of non-overlapping tiles, encoding the quantized pixel depth values into a compressed depth image. In this example or any other example, the method further comprises, for each of the plurality of non-overlapping tiles, identifying a depth range between a minimum pixel depth value and a maximum pixel depth value for pixels in the tile, where the pixel depth values from the tile are quantized over the range into the quantized pixel depth values. In this example or any other example, the quantized pixel depth values are encoded as encoded pixel depth values included in the compressed depth image, and the compressed depth image further includes, for each of the plurality of non-overlapping tiles, the depth range between the minimum pixel depth value and maximum pixel depth value. In this example or any other example, quantizing the pixel depth values includes, for each non-overlapping tile of the plurality, classifying the tile as having a continuous or a non-continuous distribution of pixel depth values, where tiles having a non-continuous distribution of pixel depth values include two or more depth value clusters separated by at least a threshold distance. In this example or any other example, quantizing the pixel depth values into quantized pixel depth values further includes, for each of the plurality of non-overlapping tiles classified as having a non-continuous distribution of pixel depth values, independently quantizing each of the two or more depth value clusters for the tile. In this example or any other example, the two or more depth value clusters for the tile are independently quantized as two or more separate sets of quantized pixel depth values, and each quantized pixel depth value for the tile has an associated identifier indicating to which of the two or more separate sets the quantized pixel value belongs. In this example or any other example, the quantized pixel depth values are encoded into the compressed depth image using a monochrome video encoder. In this example or any other example, the monochrome video encoder is one of an h264 encoder, an h265 encoder, and an av1 encoder. In this example or any other example, the quantized pixel depth values are encoded into the compressed depth image using a video encoder that uses one or more chroma channels. In this example or any other example, encoding the quantized pixel depth values includes inputting zeroes to the one or more chroma channels of the video encoder. In this example or any other example, the method further comprises, prior to quantizing the pixel depth values, dividing a second depth image into a second plurality of non-overlapping tiles, such that each tile in the depth image has a corresponding tile in the second depth image. In this example or any other example, the second depth image is received from a remote computing device and represents a scene in which one or more virtual objects rendered by the computing device are to be displayed. In this example or any other example, the method further comprises, for a particular tile in the depth image having a minimum pixel depth value greater than a maximum pixel depth value of a corresponding tile in the second depth image, quantizing a replacement pixel depth value that is equal to or greater than the minimum pixel depth value of the particular tile. In this example or any other example, the method further comprises, for a particular tile in the depth image having a maximum pixel depth value less than a minimum pixel depth value of a corresponding tile in the second depth image, quantizing a replacement pixel depth value that is equal to or less than the maximum pixel depth value of the particular tile. In this example or any other example, the method further comprises, for a particular tile in the depth image having a range of pixel depth values that overlaps with a corresponding second range of pixel depth values of a corresponding tile in the second depth image, quantizing a replacement range of pixel depth values for the particular tile, the replacement range of pixel depth values comprising an intersection between the range of pixel depth values and the corresponding second range of pixel depth values. In this example or any other example, the method further comprises transmitting the compressed depth image to a remote device. In this example or any other example, the depth image is captured by a depth camera and represents a real-world environment of the computing device. In this example or any other example, the depth image represents a three-dimensional virtual scene generated by the computing device.

In an example, a computing device comprises: a logic machine; and a storage machine holding instructions executable by the logic machine to: for a depth image including a matrix of pixels, each pixel including a pixel depth value, divide the depth image into a plurality of non-overlapping tiles, each of the plurality of non-overlapping tiles including a contiguous subset of pixels; for each of the plurality of non-overlapping tiles, quantize the pixel depth values into quantized pixel depth values; and for each of the plurality of non-overlapping tiles, encode the quantized pixel depth values into a compressed depth image.

In an example, a method for decompressing a depth image comprises: at a computing device, receiving a compressed depth image from a remote device, the compressed depth image including a plurality of encoded pixel depth values that encode a plurality of original pixel depth values in a pre-compression version of the depth image, the pre-compression version of the depth image divided into a plurality of non-overlapping tiles each including a contiguous subset of pixels, and the compressed depth image further including a depth range between a minimum pixel depth value and a maximum pixel depth value for each of the plurality of non-overlapping tiles in the pre-compression version of the depth image; decoding each set of encoded pixel depth values into quantized pixel depth values; and based on the depth range between the minimum pixel depth value and maximum pixel depth value for each of the plurality of non-overlapping tiles, converting the quantized pixel depth values into original pixel depth values to give a decompressed version of the depth image depth image.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method for compressing a depth image including a matrix of pixels, each pixel including a pixel depth value, the method comprising:
 dividing the depth image into a plurality of non-overlapping tiles, each of the plurality of non-overlapping tiles including a contiguous subset of pixels;
 for each of the plurality of non-overlapping tiles, quantizing the pixel depth values into quantized pixel depth values; and
 for each of the plurality of non-overlapping tiles, encoding the quantized pixel depth values into a compressed depth image.

2. The method of claim 1, further comprising, for each of the plurality of non-overlapping tiles, identifying a depth range between a minimum pixel depth value and a maximum pixel depth value for pixels in the tile, where the pixel depth values from the tile are quantized over the range into the quantized pixel depth values.

3. The method of claim 2, where the quantized pixel depth values are encoded as encoded pixel depth values included in the compressed depth image, and where the compressed depth image further includes, for each of the plurality of non-overlapping tiles, the depth range between the minimum pixel depth value and maximum pixel depth value.

4. The method of claim 1, where quantizing the pixel depth values includes, for each non-overlapping tile of the plurality, classifying the tile as having a continuous or a non-continuous distribution of pixel depth values, where tiles having a non-continuous distribution of pixel depth values include two or more depth value clusters separated by at least a threshold distance.

5. The method of claim 4, where quantizing the pixel depth values into quantized pixel depth values further includes, for each of the plurality of non-overlapping tiles classified as having a non-continuous distribution of pixel depth values, independently quantizing each of the two or more depth value clusters for the tile.

6. The method of claim 5, where the two or more depth value clusters for the tile are independently quantized as two or more separate sets of quantized pixel depth values, and each quantized pixel depth value for the tile has an associated identifier indicating to which of the two or more separate sets the quantized pixel value belongs.

7. The method of claim 1, where the quantized pixel depth values are encoded into the compressed depth image using a monochrome video encoder.

8. The method of claim 7, where the monochrome video encoder is one of an h264 encoder, an h265 encoder, and an av1 encoder.

9. The method of claim 1, where the quantized pixel depth values are encoded into the compressed depth image using a video encoder that uses one or more chroma channels.

10. The method of claim 9, where encoding the quantized pixel depth values includes inputting zeroes to the one or more chroma channels of the video encoder.

11. The method of claim 1, further comprising, prior to quantizing the pixel depth values, dividing a second depth image into a second plurality of non-overlapping tiles, such that each tile in the depth image has a corresponding tile in the second depth image.

12. The method of claim 11, where the second depth image is received from a remote computing device and represents a scene in which one or more virtual objects rendered by the computing device are to be displayed.

13. The method of claim 11, further comprising, for a particular tile in the depth image having a minimum pixel depth value greater than a maximum pixel depth value of a corresponding tile in the second depth image, quantizing a replacement pixel depth value that is equal to or greater than the minimum pixel depth value of the particular tile.

14. The method of claim 11, further comprising, for a particular tile in the depth image having a maximum pixel depth value less than a minimum pixel depth value of a corresponding tile in the second depth image, quantizing a replacement pixel depth value that is equal to or less than the maximum pixel depth value of the particular tile.

15. The method of claim 11, further comprising, for a particular tile in the depth image having a range of pixel depth values that overlaps with a corresponding second range of pixel depth values of a corresponding tile in the second depth image, quantizing a replacement range of pixel depth values for the particular tile, the replacement range of pixel depth values comprising an intersection between the range of pixel depth values and the corresponding second range of pixel depth values.

16. The method of claim 1, further comprising transmitting the compressed depth image to a remote device.

17. The method of claim 1, where the depth image is captured by a depth camera and represents a real-world environment of the computing device.

18. The method of claim 1, where the depth image represents a three-dimensional virtual scene generated by the computing device.

19. A computing device, comprising:
 a logic machine; and
 a storage machine holding instructions executable by the logic machine to:
  for a depth image including a matrix of pixels, each pixel including a pixel depth value, divide the depth image into a plurality of non-overlapping tiles, each of the plurality of non-overlapping tiles including a contiguous subset of pixels;
  for each of the plurality of non-overlapping tiles, quantize the pixel depth values into quantized pixel depth values; and
  for each of the plurality of non-overlapping tiles, encode the quantized pixel depth values into a compressed depth image.

20. A method for decompressing a depth image, the method comprising:

at a computing device, receiving a compressed depth image from a remote device, the compressed depth image including a plurality of encoded pixel depth values that encode a plurality of original pixel depth values in a pre-compression version of the depth image, the pre-compression version of the depth image divided into a plurality of non-overlapping tiles each including a contiguous subset of pixels, and the compressed depth image further including a depth range between a minimum pixel depth value and a maximum pixel depth value for each of the plurality of non-overlapping tiles in the pre-compression version of the depth image;

decoding each set of encoded pixel depth values into quantized pixel depth values; and based on the depth range between the minimum pixel depth value and maximum pixel depth value for each of the plurality of non-overlapping tiles, converting the quantized pixel depth values into original pixel depth values to give a decompressed version of the depth image.

* * * * *